United States Patent
Bugnet et al.

(10) Patent No.: US 6,290,832 B1
(45) Date of Patent: *Sep. 18, 2001

(54) POROUS STRUCTURES HAVING A PRE-METALLIZATION CONDUCTIVE POLYMER COATING AND METHOD OF MANUFACTURE

(75) Inventors: Bernard Bugnet, Plessis-Trevise; Max Costa, Montrouge; Denis Doniat, Paris, all of (FR)

(73) Assignee: S.C.P.S. Societe de Conseil et de Prospective Scientifique S.A.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/691,241

(22) Filed: Aug. 2, 1996

(30) Foreign Application Priority Data

Aug. 4, 1995 (FR) .................................................. 95 09547

(51) Int. Cl.$^7$ ................................ C25D 5/54; C25D 5/34
(52) U.S. Cl. ........................ 205/161; 205/160; 205/205; 205/210
(58) Field of Search ................................... 205/103, 159, 205/160, 161, 210

(56) References Cited

U.S. PATENT DOCUMENTS

| | | | | |
|---|---|---|---|---|
| 4,244,789 | * | 1/1981 | Coll-Palagos | 205/159 |
| 5,106,473 | * | 4/1992 | Whitlaw et al. | 205/150 |
| 5,194,313 | * | 3/1993 | Hupe et al. | 428/137 |
| 5,553,700 | * | 9/1996 | Smith et al. | 198/780 |
| 5,575,898 | * | 11/1996 | Wolf et al. | 205/159 |
| 5,584,983 | * | 12/1996 | Pruyn | 205/103 |
| 5,591,482 | * | 1/1997 | He et al. | 427/244 |
| 5,597,471 | * | 1/1997 | Ragge et al. | 205/159 |

FOREIGN PATENT DOCUMENTS

| 4023619 | * | 9/1991 | (DE) . |
|---|---|---|---|
| 6-248491 | * | 9/1994 | (JP) . |

* cited by examiner

Primary Examiner—Edna Wong
(74) Attorney, Agent, or Firm—Henderson & Sturm LLP

(57) ABSTRACT

The invention concerns the manufacture of complex metallic or metallized porous structures, wherein the electroplating metal over the entire developed surface is preceded by a specific pre-metallization of the basic structure. The pre-metallization is obtained by depositing a conductive polymer, which is deposited on the entire developed surface of the structure by the steps of an oxidizing pre-treatment of the structure, depositing in the liquid phase, a monomer having a polymerized form that is electrically conductive, and polymerizing by oxidation-doping of the monomer. The structures according to the invention are particularly intended for use as electrodes for the electrolysis of liquid effluents, as electrode supports for electrochemical generators, as catalyst supports, filtration media, phonic insulation, electromagnetic and nuclear protection structures, or for other applications.

5 Claims, No Drawings

POROUS STRUCTURES HAVING A PRE-METALLIZATION CONDUCTIVE POLYMER COATING AND METHOD OF MANUFACTURE

The invention concerns, in general, the manufacture of complex porous metallic or metallized structures.

This invention relates more particularly to the manufacture of complex porous metallic or metallized structures for application as electrodes for the electrolysis of liquid effluents, as electrode supports for electrochemical generators, as catalyst supports, filtration media, phonic insulation, electromagnetic and nuclear protection structures, or for other applications.

The metallic or metallized structures according to the invention are of the foam, felt or fabric type having a high level of open porosity, and having the aspect of a dense network of fibers or mesh with a three dimensional skeletal structure defining a plurality of open spaces intercommunicating with one another and with the exterior of the structures.

Foams are reticulated cellular structures of high porosity (greater than 80%, and possibly reaching 98%) and having an open porosity by inhibiting cell wall formation, wherein the totality of the network's openings, or at least a high proportion thereof, are in communication with one another.

Felts are randomly interlaced matted fibers defining therebetween inter-fiber spaces of variable shapes and dimensions, communicating with one another.

Fabrics are structures constituted by an assembly of textile threads or fibers that are interlaced, either woven or netted. They may be in the form of thick and complex structures, in particular when they are made of two external woven faces connected by knitted threads that hold them simultaneously spaced apart and interconnected, as for example can be produced using Raschel type knitting machines.

These various complex porous structures, that according to the invention will be metallized throughout their entire thickness, over all their developed surface, without clogging of their porosity, may be provided starting from various base materials.

For foams, organic, mineral or synthetic materials are used, and in particular polymers such as polyester, polyamide, polyurethane or polyether.

For felts and fabrics, organic mineral or synthetic materials are also used such as the previously-cited polymers, or glass, rock or carbon fibers, or natural fibers such as cotton, wool or the like.

Various processes for metallizing such structures have already been proposed, including:
  chemical deposition, followed by one or several electrochemical depositions,
  deposition of carbon or graphite particles, followed by one or several electrochemical depositions,
  vacuum deposition of metals, in particular by cathodic vaporization, gas diffusion or ionic deposition. followed by one or several electrochemical depositions,
  chemical vapor deposition.

Whenever electrochemical deposition will be carried out, one should previously prime the surface to be electroplated, to render it electrically conductive. This is the purpose of the "pre-metallizing" stage incorporated in most of the cited processes (chemical deposition, deposition of carbon particles, vacuum deposition).

The present invention is concerned particularly with carrying out a pre-metallization process in the manufacture of complex porous metallic structures, which process provides various advantages relative to the previous techniques for the production of said products.

Chemical deposition on an industrial scale is an expensive process and is somewhat difficult to control. It involves the consumption of expensive chemical products (tin, palladium, . . . ) and necessitates, between each of its steps, careful rinsing operations on complex porous structures which have a high retentive power, in order to avoid undesirable contamination by transfer of the reactive components from one treatment bath to the next. This process generally provides a very efficient pre-metallization, in particular with a high penetrating power in the structures to be treated, but generates additional costs due to the necessity of retreating its liquid effluents.

The deposition of carbon or graphite particles, which is widely used up to date on an industrial scale for the production of metallic foams, is relatively inexpensive, both in terms of the products consumed and as regards the investments necessary for carrying it out. It however has three types of drawback:

the carbon particles do not form a continuous conductive deposit on the surface of the structure's openings. Electrochemical metallization therefore has to provide a bridging of these particles between one another. In some cases, the initial phase of propagation of the electroplated deposit through the entire volume of the structure is slow, and should preferably be carried out with enhancement of the structure's conductivity using metallic anodic contacts, in order to achieve economically acceptable recovery rates;

because of the size of the carbon particles, It is not possible with this method, without clogging the internal porosity, to treat denser structures: foams having a porosity greater than 100 ppl (100 pores per linear inch), dense felts, or thick and dense fabrics made of fine fibers whose external woven faces are connected by knitted threads that maintain the external faces simultaneously spaced apart and interconnected;

the deposition of carbon particles complicates the step of pyrolysis of the organic materials after metallization, due to a substantial increase of their mass.

Among vacuum deposition methods, only cathodic vapor deposition is industrially used for the pre-metallization of complex porous structures like those used in the invention. This method, described in French Patent 2,558,485 of Jan. 25, 1984, is generally regarded as the most efficient one for the application under consideration.

It however requires the use of sophisticated industrial devices, precise and delicate operating procedures must be followed, and the investment in production equipment is relatively high. At the present time, there are two limitations with this process:

although it enables a homogeneous continuous deposition within complex porous structures with a high penetrating power, the process nevertheless has limitations in terms of the thickness of the substrate to be treated and the density of fibers or openings (these two criteria being combinable), in particular when the substrate is constituted of an organic material that must not be subject to great increases of temperature;

at the present time, this method enables a batch operation (for the treatment of plates) or a semi-continuous operation (treatment using rollers) but not a truly continuous operation at an economically acceptable cost.

The pre-metallization processes summarized above are satisfactory from the point of view of industrial production on a large scale, but nevertheless have the described drawbacks.

It is furthermore generally speaking always desirable to reduce the cost of known processes and to simplify the carrying out of these processes, in order to reduce the cost of the resulting products. These are two of the advantages obtained by the present invention.

The present invention, through a specific adaptation of a process which is known for applications that are simpler to carry out, aims to permit the electroplating (galvanic metallization) of the above-defined porous complex structures by providing a pre-metallization by the preliminary deposition of a conductive polymer, so the later metallization can then itself be carried out in specific conditions related to the nature of the pre-metallization layer.

The use of conductive polymers has already been described to permit electroplating to be carried out. This use, as with other prior pre-metallization techniques, has been designed, defined and made operational for application to simple or relatively simple surfaces: smooth surfaces, or smooth surfaces connected by holes of diameter greater than 0.5 mm, the depth of the holes being of the order of 1 mm. The prior use notably concerned the pre-metallization of printed circuit boards.

The pre-metallization treatment of the complex porous structures as described above, by means of a deposit of conductive polymers, does not follow directly from the way the process has been used for treating simple surfaces. Carrying out this treatment, which underwent several unsuccessful trial-and-error attempts to develop it, as will be understood from the following explanations.

As is known, the deposition of metals or alloys by well known techniques that are mastered for smooth surfaces, may be impossible to carry out or may require the implementation of specific methods when it is desired to carry them out on complex surfaces. For example, this is so for chromium plating. The same applies to the production of a continuous deposit of a conductive polymer on the porous complex structures of this application, on industrial scale, and which enables the subsequent electrochemical deposition throughout all of the thickness of the structure, on all of its developed surface, without clogging its porosity.

The specifics of developing a suitable deposition technique come not only from the extreme tortuosity of the structures to be treated, their thickness, the low inter-fiber space or pore dimension, but also from the chemical nature of the base material (usually organic) and its configuration in a particularly divided form (fibers and openings of several microns thickness).

The conductive polymer layer is obtained by polymerization of a monomer deposited on the fibers or openings of the substrate to be treated. This polymerization is carried out by oxidation-doping of the monomer.

Certain monomers such as pyrrole, furane, thiophene and certain derivatives thereof, and in particular functional monomers, have the property of being oxidizable into polymers having the characteristic of being electrically conductive.

In some of the processes of this type, the polymer deposition takes place in the gas phase, but it will easily be understood that such a gas-phase process is complex and difficult to carry out within highly porous structures.

In other processes which concern the treatement of porous or non-porous surfaces (but which are poorly adapted for the specific treatment of very porous surfaces), all of the steps are carried out in the wet (liquid) phase in precise operating conditions which were said to provide the advantage of dispensing with the need for any rinsing between the different steps. However, this is clearly contrary to the teaching of the present invention, as will be explained in detail later. It is thought that this process, as well as the previously mentioned one, underestimates the inherent constraints of porous surfaces and hence claims to be equally applicable to all types of surface.

Finally, other processes carry out polymerization of a monomer deposited on the surface's support by anodization, which radically differenciates them from the process according to the invention.

The invention precisely concerns complex porous structures of the reticulated foam, felt or fabric type, which are pre-metallized throughout their structures, and a process for manufacturing such structures comprising the following sequential steps:

(1) oxidizing pre-treatment of the base structure, (2) rinsing, possibly followed by draining and drying, (3) deposit in a wet phase, on the surface of the fibers or openings of the structure, of a monomer which in a polymerized form is electrically conductive, (4) possible natural draining and/or forced draining, (5) polymerization by oxidation-doping of the monomer into an electrically conductive polymer, (6) rinsing, and possible draining, (7) possible drying.

wherein these steps are carried out within the structure, throughout its entire thickness, over the surface of each of its fibers or openings, without clogging its pores, and steps (3) to (7) may be repeated in the same order several times.

The invention also concerns a process for producing complex metallic or metallized porous structures, comprising the steps of pre-metallization with a conductive polymer and electroplating of metals on organic or mineral foams, felts or fabrics, possibly followed by pyrolysis of the original materials and of the pre-metallization components, and a heat treatement under controlled atmosphere of the metallic deposit or deposits, in which the pre-metallization comprises the following steps:

(1) oxidizing pre-treatment of the base structure, (2) rinsing, possibly followed by draining and drying, (3) deposit in a wet phase, on the surface of the fibers or openings of the structure, of a monomer which in a polymerized form is electrically conductive, (4) possible natural draining and/or forced draining, (5) polymerization by oxidation-doping of the monomer into an electrically conductive polymer, (6) rinsing, and possible draining, (7) possible drying.

wherein these steps are carried out within the structure, throughout its entire thickness, over the surface of each of its fibers or openings, without clogging its pores, and steps (3) to (7) may be repeated in the same order several times.

Hence, contrary to what has been discussed above, the rinsing steps are important steps as regards the quality of the pre-metallization layers obtained and, consequently, of the final electrodes. The final rinsing is particularly significant because it enables impurities such as iron, which could remain in the finished product after the electroplating and thermal treatments, to be eliminated.

By "wet phase" is hereafter meant a treatment in the liquid phase, for example in a solution, or a treatment in contact with a mist which, by definition, contains fine droplets of liquid.

The initial oxidizing pre-treatment step (1) becomes critically important for successful pre-metallization when carried out within a complex porous structure. This is because the electroplating, which follows the pre-metallization treatment, must be carried out as regularly as possible, within the structure itself over the entire surface of each of said structure's fibers or openings. The metallic structure must be the exact replica of the initial structure before treatment. It is therefore required that each fiber or opening, in the entire internal volume of the structure as well as on its surface, must be rendered conductive during the pre-metallization treatment. For this, it is indispensable that deposition of the monomer, before its later conversion into a conductive polymer, must have taken place over the entire surface of the fibers or openings, without clogging the surface and internal porosity. The monomer must be properly attached on the fibers or openings, and not in a more-or-less free manner within the structure with part filling or with bridging the inter-fiber spaces or the pores.

It has been observed that should the oxidizing pre-treatment prior to depositing the monomer not have been carried out in an appropriate manner, the monomer tends to precipitate in a disordered fashion within the structure without following the initial architecture thereof and does not coat all of the fibers or openings of these thick, dense and complex structures.

The oxidizing pre-treatment of the invention is preferably but not exclusively carried out by immersing the structure in a solution containing permanganate/manganate salts and/or cerium IV compounds. It may also be carried out by spraying said solution within the structure, or by holding the structure in a mist of the same composition.

The oxidizing pre-treatment has an essential double function in producing products according to the invention:

it localizes precipitation of the monomer solely on the surface of the fibers or openings within the complex porous structure, it takes part in polymerizing the monomer from the lower or hidden face of deposit.

The pre-treatment, in order to prepare for a proper deposit of the monomer, provides a superficial etching of the fibers or openings constituting the skeleton of the structure to be treated. Surface priming is carried out by etching the constituent organic material, which produces a surface microporosity leading to the production of an excellent bonding surface for the later deposit of the monomer, which will then preferentially precipitate onto this bonding surface instead of in a disordered manner in the porosity of the structure. Clogging of the structure to be processed can thus be avoided.

Obviously, these considerations are not a cause for concern when the pre-metallization and metallization have to be made on simple or relatively simple surfaces, for example non-porous surfaces.

The second function of this oxidizing pre-treatment is equally fundamental when one considers that the metallization to be carried out following pre-metallization with the conductive polymer must itself be carried out within the complex porous structure, through its entire thickness, by a homogeneous and continuous coating of the fibers or openings, without clogging the internal and surface porosity. To correctly electroplate such dense three-dimensional structures through to the core of the structure requires that the pre-metallization must provide each point thereof with a sufficient electrical conductivity.

The fineness of the fibers or openings, the thinness of the monomer deposit and hence of the polymer obtained by oxidization thereof, and the limited intrinsic conductivity of the polymer obtained all necessitate a polymerization of the precipitated monomer which is as complete as possible.

For this, it is necessary that oxidation of the layer of monomer should undergo oxidizing attack which leads to its polymerization, not only from its outer surface, but also from its lower hidden face adhering to the bonding surface of the structure's fibers or openings. This lower face is protected from the oxidizing-doping action of the above mentioned step (5). To obtain a sufficiently polymerized pre-metallization layer, and consequently a sufficiently conductive layer, it is very important that polymerization of the monomer may take place from both sides.

There is no such constraint when the subsequent electroplating has to be made on a simple or relatively simple surface. The operative conditions for the oxidizing pretreatment are also considerably less critical when, in the known case of the treatment of printed circuit boards, the material to be treated is in the form of a continuous thick board, of the order of one millimeter thick. The etching produced by the oxidizing pre-treatment cannot rapidly and undesirably damage such a board being etched.

All this is quite different when treating complex porous structures according to the invention, whose fibers or openings have a thickness of the order of several microns. If the oxidizing etching treatment is not carried out in an appropriate way, it may weaken the structure or lead to rupture of the fibers or openings. The acidity of the pre-treatment solution, its temperature and the duration of the operation, as well as the efficiency of the subsequent rinsing step or steps constitute in this case critical parameters which have to be specifically adapted to the treated structure.

The second step (2) of the pre-metallization process is consequently rinsing the structure after the oxidizing treatment. The structures according to the invention, be they foams, felts or fabrics, have a high liquid retention capacity. It is thus important, in order that the oxidizing-etching stop of the pre-treatment should not be undesirably protracted, to proceed, immediately after the end of said pre-treatment, with a careful rinsing phase. Depending on the treated material's structure, this operation can be carried out in one or several rinsing steps, in a neutral or slightly acid medium, in a static bath, a flowing rinsing bath and/or with spraying of the structure. Such expedients are contrary to the teachings of the literature cited above. Draining operations may be carried out.

After each wet treatment step—steps (1), (3) and (5) of the process—a draining of the structure before any optional rinsing steps that prove necessary enables excess fluids and active components to be economically recuperated. This may also be followed by drying.

The third step (3) of the pre-metallization process according to the invention consists in depositing or precipitating the selected monomer.

This step is preferably carried out by immersing the structure in a solution of the said monomer. It may also, within the scope of the present invention, be carried out by spraying said solution within the structure, or by holding the structure in a mist of the same composition.

One or several monomers whose polymerized form is electrically conductive can be deposited at choice, preferably, but not exclusively, selected from amongst pyrrole, furane, thiophene, and/or derivatives thereof.

It is important and is inherent in the invention to make a careful selection of the monomer and of all of the components of the precipitating solution. The double objective at this stage is:

to avoid the use of a monomer and of a solvent which, on an industrial scale, would be liable to lead to security problems (toxicity for the operators, a danger of pollution by generating liquid effluents to be retreated, formation of a polymer whose elimination after metallization would itself lead to dangerous gaseous effluents).

to employ products whose material cost and whose cost of implementation are compatible with the need to seek an economical pre-metallization process.

Finally to carry out the method according to the invention of precipitating the monomer in a complex porous structure, the monomer solution must have a viscosity compatible with a good penetration into the structure, in such a manner as to easily impregnate said structure throughout its entire thickness, without any obstruction and without formation of air bubbles within the internal pores, which would be detrimental to achieving a continuous precipitation over the entire surface of the fibers or openings of the structure.

Step (4) of the pre-metallization treatment of structures according to the invention consists in a possible natural draining and/or forced draining of the structures. This step will determine the quality of the finished products.

The fifth step (5) is that of polymerizing the monomer or monomers. This is preferably but not exclusively achieved in the invention by immersing the structure to be treated in an oxidizing-doping solution selected to lead to the desired polymer or polymers. It may also, within the scope of the present invention, be carried by spraying said solution within the structure, or by holding the structure in a mist of the same composition.

This polymerization takes place starting from the outside face of the monomer deposited in step (3), and progresses into the inside of the layer of monomer precipitated on the fibers or openings of the structure.

As has been seen above, it is important that polymerization should also develop through the inside face of the monomer deposit, by a reaction achieved by careful selection of the oxidizing pre-treatment of step (1), and which starts to occur as from step (3), precipitation of the monomer.

Polymerization must be followed by a step (6) of rinsing the structure, which may be carried out in the same manner as the rinsing of step (2), both of which operations are equally indispensable.

The pre-metallization treatment must be completed by a natural or forced drying step (7) of the treated structure.

Steps (3) to (7) may possibly be repeated in the same sequence to obtain the desired polymer deposit providing sufficient electrical conductivity for the subsequent metallization.

In order to provide a clear idea, the various criteria and parameters which should preferably be followed to obtain exploitable results are given in the following Examples and Table, which are given by way of non-limiting example.

We will hereafter describe a complete pre-metallization treatment according to a preferred embodiment of the invention by depositing a conductive polymer, followed by the electroplating of a complex porous structure.

EXAMPLE 1

The structure to be metallized is an open-pored polyurethane foam of 100 ppl grade, 1.7 mm thick, whose density is 50 g/m$^2$ of the apparent surface.

The oxidizing pre-treatment step (1) is carried out by immersing the foam for 4 minutes in an aqueous solution of potassium permanganate (KMnO$_4$), having a concentration of 20 g/liter, and pH substantially equal to 7. An acid pH could lead to a too strong attack of the foam. Immersion is carried out in a solution at a temperature between 70 and 80° C.

The use of this pre-treatment solution has the advantage of leading to the formation, at the surface of the openings of the foam, of a layer of manganese dioxide (MnO$_2$). When the precipitation of the monomer takes places subsequently, the MnO$_2$ in contact therewith will pass at least partially to a lower state of oxidation which will then produce oxidation and therefore the polymerization of the monomer by its lower face.

The rinsing step (2) is carried out, after a first draining, by immersing the foam in a static water bath, then by spraying the foam, also with water.

The foam is then drained for a short time and partly dried under hot air.

Step (3) of precipitating the monomer is carried out by immersing the foam in a solution of pyrrole (C$_4$H$_5$N) in an ethanol/water, propanol/water or isopropanol/water mixture.

It is known that pyrrole is easily soluble in benzene. As the use of benzene on an industrial scale involves substantial safety problems for the operators and for the environment, another solvent for the pyrrole was sought and a lower alcohol, notably isopropanol, was selected. This furthermore enables the dissolution of pyrrole in an aqueous solution that can contain more than 50% by volume of water.

The composition used in the example is as follows:

80 cm$^3$/liter of pyrrole 120 cm$^3$/liter of isopropanol 800 cm$^3$/liter of water The temperature of the solution is preferably selected below ambient temperature, and for this example was 15° C., for a foam immersion time of 10 to 15 minutes.

To prepare the solution, water can be added to the pyrrole before or after the isopropanol. Dissolution is however easier if isopropanol is added first.

The quantity of pyrrole deposited at the and of this step is several grams per square meter of the apparent surface area of the foam, in the present example 5 g/m$^2$.

It will be noted that the choice of pyrrole on the one hand, and isopropanol on the other hand, and lastly an aqueous solution, make this step, and due to this the entire pre-metallization method according to the invention, particularly inexpensive.

The foam is then drained—step (4)—for about fifteen seconds.

Step (5) of polymerizing the pyrrole into polypyrrole is carried out by immersing the foam in an aqueous oxidizing-doping solution having the following composition:

50 g/liter ferric chloride FeCl$_3$ 50 cm$^3$/liter of fluoroboric acid BF$_4$, 34%

The temperature of the solution is approximately 20° C., and the duration of the polymerization treatment is from 10 to 15 minutes.

Rinsing then takes place in a static water bath followed by spraying the foam with water, before drying in warm air.

After a single precipitation/polymerization sequence, measurement of the resistance of the foam gave values comprised between 250 and 500 Ω squared.

EXAMPLE 2

The pre-metallization treatment is applied to a polyester felt 1.5 mm thick and having a mass of 80 g/m$^3$ of its apparent surface area.

The steps described in Example 1 above are reproduced identically, apart from a single modification in step (1) for which it is possible and preferable that the pH of the solution be 3.5.

The following Table summarizes in synoptic form the selection of the technical parameters of the previous examples leaded to optimum results:

10 times more than the useful quantity deposited may be driven off).

avoids ageing of the polymerization solution.

|  | Oxidizing Pre-Treatment with KMnO$_4$ | | | Monomer Deposition (Pyrrole) | | | Polymerization Treatment of the Monomer with FeCl$_3$ | | |
| --- | --- | --- | --- | --- | --- | --- | --- | --- | --- |
|  | Minimum | Optimum | Maximum | Minimum | Optimum | Maximum | Minimum | Optimum | Maximum |
| CONCENTRATIONS | 20 g/l | 25–30 g/l | 50 g/l | Water: 35% by volume | (1) 80–85% by volume (2) 50% by volume | 94% by volume | FeCl$_3$: 10 g/l | 50 g/l | 100 g/l |
|  |  |  |  | Pyrrole: 2% by volume | (1) 5% by volume (2) 15% by volume | 20% by volume | Acid Bf$_4$ 10 cc/l | 50 cc/l | 100 cc/l |
|  |  |  |  | Alcohol: 4% by volume | ethanol or (1) 10–15% by volume (2) 35% by volume | (iso)propanol 45% by volume | Water: | remainder |  |
| TREATMENT TIME | 2 mn | 3 mn | 4 mn | 3 mn | (1) 5 mn (2) 20 mn | 30 mn | 10 mn | (1) 15–20 mn (2) 30 mn | 40 mn |
| TEMPERATURE | 60° C. | 70° C. | 80° C. | 10° C. | 15° C. | 20° C. | 10° C. | 16–20° C. | 30° C. |
| pH | 7 | 8 | 9 |  |  |  |  |  |  |

(1) polyurethane foam
(2) felt or fabric of polyester fibers

This Table should be studied with the following comments which clearly highlight the influence exerted by the various technical parameters set out. It concerns polyurethane foams and felts or fabrics of polyester fibers.

Pre-treatment with KMnO$_4$ for concentrations below the indicated minimum value there is an insufficient deposit of MnO$_2$, leading to an insufficient deposit of pyrrole and polypyrrole and a too great electrical resistance.

for concentrations above the indicated maximum value there is growth of the MnO$_2$ deposit (waste) but a fixed stable quantity of polypyrrole and an excessive electrical resistance. Moreover, the structure of the foam is weakened with a risk of tearing.

Treatment of Pyrrole Deposit the purpose of the alcohol (ethanol or propanol) is to dissolve the pyrrole.

the greater the concentration of pyrrole, the greater is the deposit thereof, but above 5% by volume the final conductivity is not increased.

Polymerization Treatment of the Pyrrole the quantity of polypyrrole formed increases with the concentration of FeCl$_3$ up to a threshold of 50 g/l.

for a treatment time less than the minimum indicated value, an insufficient quantity of polypyrrole is formed.

for a treatment time longer than the indicated maximum value, the morphology of the polypyrrole deposit tends to become irregular. There is no longer a smooth coating of the openings or fibers, but filiment formation within the pores of the structure.

Intermediate Water Rinsing Step After the Pre-treatment with KMnO$_4$ this must be carried out with care to obtain the most efficient rinsing possible in order to avoid carrying over of permanganate into the salts of the pyrrole bath (waste).

Intermediate Forced Draining Step After the Pyrrole Deposit this avoids wasting pyrrole (without draining, from 5 to this forced draining can be carried out by passing the structure between two rolls without excess pressure, or by suction or blowing of the drained solution.

at this stage, no rinsing should be carried out, as this would lead to an unwanted removal of the deposited pyrrole.

Final Polymerization Step rinsing the structure with water, drying.

EXAMPLE 3

The electroplating may then be carried out an the pre-metallized foam or felt.

Various metallizations on foams treated according to the method described in the above example have been carried out, namely electrolytic deposition of copper, nickel and lead.

In particular, nickel has been plated from a Watts bath, this deposit having a density of 450 g/l$^2$ of the apparent surface area, distributed over the entire developed surface area of the foam.

According to the invention, metal plating onto the conductive polymer pre-metallization can be favorized by implementing measures for maintaining the level of conductivity of the polymer during the initial phase of plating.

Three measures for this purpose and which fall within the scope of the invention have been carried out on foams pre-metallized according to the above example:

electroplating in a bath containing ions which stabilize or oxidize the anodic structure;

starting electroplating at a low current density;

electrolysis with a pulsed current with current reversal.

These three measures, or any two of them, may be combined to optimize conditions for the electroplating onto the conductive polymer.

The first of these measures aims to provide, at the polymer/electrolyte interface, a stabilizing or oxidizing function able to counterbalance the reducing effect of the electrolyte on the structure to be plated, which is placed as an anode in the bath, and more particularly on its conductive coating. The effect of a reducing action on the polymer is to reduce its conductivity and hence to hinder initiation of the electrochemical deposit, especially deep inside the structure.

For this, according to a preferred variant of the invention, plating takes place in the case of a nickel deposit in a bath containing ions that stabilize or oxidize the conductive anodic deposit.

The second measure according to the invention for assisting initiation of the electroplating aims to avoid damaging the conductive polymer layer before a first continuous or quasi continuous metallic layer is constituted on its surface having a conductivity at least equal to that of the polymer. This measure consists of carrying out electrolysis at a low current density, for example starting from about 1 to 4 $A/dm^2$ of the apparent surface area of the structure in the case of nickel plating from a Watt's type bath.

As soon as the metal coating has deposited on all or essentially all of the developed surface area of the structure, its conductivity is sufficiently enhanced (and the polymer protected) to enable electrolysis to be pursued at the normal current density for a rapid deposit, namely for example of the order of 6 $A/dm^2$ in a Watt's bath.

The third measure according to the invention for optimizing the plating conditions is also carried out with a view to preserving a sufficient level of electrical conductivity of the polymer during the initial phase of the electroplating, at least until the formation of a metallic coating having an equal operative conductivity. As electrolysis has a reducing action on the anodic conductor constituted by the polymer deposit of the structure to be plated, it has proven efficient to carry out electroplating under a pulsed current with current reversal, so that each time the current is reversed, an oxidizing action compensates the preceding reducing action.

The complex porous metallic or metallized structures according to the invention may according to the invention and, in none-limiting manner, be plated by depositing copper, nickel, iron, chromium, zinc, aluminium, lead, tin, gold, platinum or any other metal from the platinum family, or by depositing alloys or mixtures or by superposing any two or more of these metals.

The porous complex metallized structures according to the invention may, after one or more electroplating steps, be subjected to a thermal treatment for pyrolizing the original materials or materials added during pre-metallization, and a thermal treatment of the metallic deposit or deposits under controlled atmosphere.

The electroplated structures obtained from the pre-metallized structures according to the invention are particularly intended for use as electrodes for the electrolysis of liquid effluents, electrode supports for electrochemical generators, catalyst supports, filtration media, phonic insulation, electromagnetic and nuclear protection structures, or for other applications.

Comparative Examples

It should be understood that in order to electroplate a metal under good conditions of speed and regularity of the deposit, that the resistances obtained should be at most about 50 Ω squared. Following the operating conditions defined above enables, on average, values of 25 Ω squared to be obtained for polyurethane foams (between about 15 and 30 Ω squared) and from about 30 to 40 Ω squared for woven or non-woven fibers structures.

Note: the measurement of resistance expressed in Ω squared is carried out by reading the resistance taken between two square brass plates which have sides a cm long separated from one another by a cm and applied onto the treated structure. It is conventional to use plates of 1 cm square separated by 1 cm.

Note also: other types of conductive activation enable efficient electroplating of metals with higher resistances. For example, of the order 1000 Ω squared by cathodic spraying of nickel, or 1500 Ω squared with a deposit of carbon powder. Much lower values (≡50 Ω squared) are required in the case of a polypyrrole deposit.

In order to measure the efficiency of a conductive activation treatment, a plating test can be carried out in the following conditions: a plate of activated foam or 100 ppl grade (pores per linear inch, internationally used measure of porosity) is submerged in an nickel electrolysis bath of the sulfamate type having a concentration of 600 g/l of nickel sulfamate, 10 g/l of nickel chloride, and 30 g/l of boric acid, of pH 4, temperature 50° C. A current density of 15 $A/dm^2$ is applied. The plate of activated foam measures 10×15 cm and the current is led in by the large upper side, at the surface of the bath.

In such conditions, a plate of initial resistance 25 Ω squared is integrally covered with nickel after 5 mn of electrolysis, a plate of initial resistance 100 to 150 Ω squared is only covered over its upper half. A plate activated by the deposition of carbon powder is generally metallized over approximately one third of its surface.

Of course, and as is clearly evident from the above, the invention is not limited to the specific embodiments which have been described only by way of example.

What is claimed is:

1. A method of producing metallic or metallized complex porous structures, said method comprising the steps of:
   pre-metallizing with a conductive polymer a material selected from the group consisting of foams, felts and fabrics, wherein pre-metallizing comprises:
   (1) oxidizing a base structure of the material comprising pores with a solution containing permanganate/manganate salts and/or cerium IV compounds;
   (2) rinsing and drying;
   (3) depositing in a wet phase, on surfaces of the base structure, a monomer which in a polymerized form is electrically conductive;
   (4) polymerization by oxidation-doping of the monomer into an electrically conductive polymer; and
   (5) rinsing and draining;
   wherein said steps are carried out on the base structure, substantially throughout its entire thickness, without clogging the pores of the base structure; and
   electroplating metal onto said selected, pre-metallized material.

2. The method of claim 1, further comprising draining and drying following the rinsing subsequent to the oxidizing.

3. The method of claim 1, comprising drying following the rinsing and draining subsequent to the polymerization by oxidation-doping.

4. The method of claim 3, comprising repeating said steps (3), (4) and (5) a preselected number of times.

5. The method of claim 1, comprising repeating said steps (3), (4) and (5) a preselected number of times.

* * * * *